Figure 1:
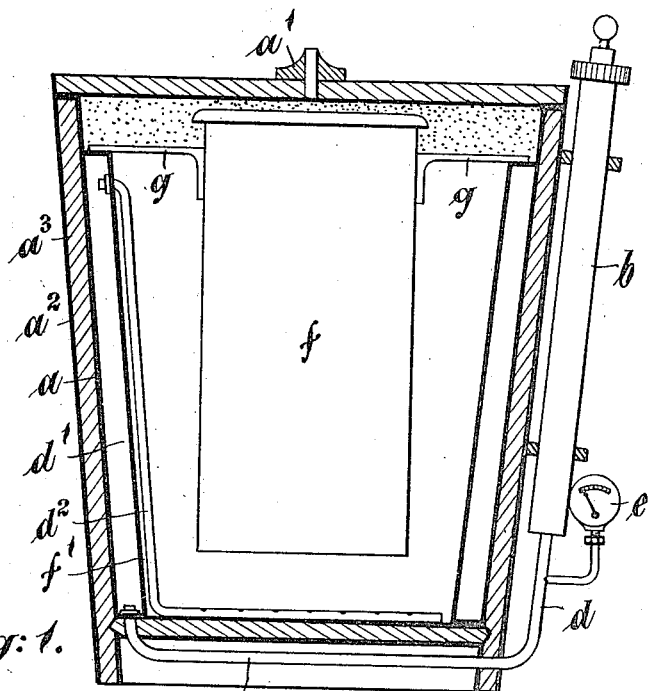

C. DE V. GRANT.
MACHINE FOR MAKING ICE.
APPLICATION FILED MAR. 29, 1915.

1,143,185.

Patented June 15, 1915.

Inventor:
Charles de Vere Grant,
by Wm Wallace White
Atty

UNITED STATES PATENT OFFICE.

CHARLES DE VERE GRANT, OF LONDON, ENGLAND.

MACHINE FOR MAKING ICE.

1,143,185.  Specification of Letters Patent.  Patented June 15, 1915.

Application filed March 29, 1915.  Serial No. 17,886.

*To all whom it may concern:*

Be it known that I, CHARLES DE VERE GRANT, a subject of the King of Great Britain and Ireland, residing at 30 Coram street, Brunswick Square, London, England, have invented new and useful Improvements in Machines for Making Ice, of which the following is a specification.

This invention relates to improvements in machines suitable for making ice and has for its object the provision of means whereby the manufacture of ice can be easily carried out in a comparatively short space of time without especial knowledge on the part of the operator; a further object being to provide a portable apparatus particularly adapted for domestic use.

The invention consists in the arrangement of one or more molds disposed within an insulated tub, bucket or vat the said molds being surrounded by a freezing mixture of any known kind agitated by compressed air supplied by a pipe or pipes sufficiently perforated with holes to efficiently distribute the air current and so placed as to keep the freezing mixture in motion around the walls of the mold or molds. The said mold or molds are supported within the tub, bucket or vat by arms allowing by this means agitation of the freezing mixture to take place all around and under the mold or molds simultaneously.

The mold or molds together with the chamber containing the freezing mixture are so disposed within the tub, bucket or vat in which they are placed that a reservoir for compressed air is formed between the wall of the chamber and the inner wall of the bucket. Gill plates may if desired be fitted to the mold or molds to increase the efficiency of the freezing operation by bringing the molds into more intimate contact with the freezing mixture.

The perforated pipe or pipes before referred to are connected to the air reservoir the holes in the said pipes being so disposed that the air is deflected in order to give the greatest amount of agitation to the freezing mixture.

The reservoir for compressed air is connected to a suitable air pump fitted exteriorly of the tub, bucket or vat, a pressure gage and a controlling valve being provided if found desirable.

To close the apparatus during operation a suitable cover is provided which is fitted with an air relief valve and which may be secured in position by known means in order to prevent the said cover being inadvertently displaced.

To enable the ice to be withdrawn from the molds I may provide the usual means adapted for that purpose such for example, as a ring which becomes embedded in the ice when it congeals and which is provided with handles.

In order that the invention may be the better understood I will now proceed to describe the same in relation to the accompanying drawings, reference being had to the letters and figures marked thereon.

Like letters refer to like parts in the various figures, in which:—

Figure 2:
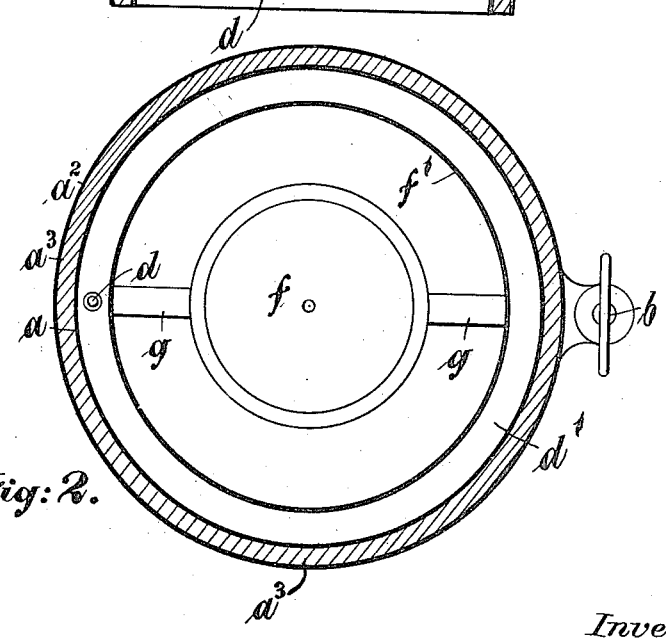

Figure 1 is a central vertical section showing a mold in position. Fig. 2 is a cross section of Fig. 1.

In the construction illustrated in Fig. 1 the machine comprises an outer casing formed by a tub, bucket or vat $a$, which is provided with a removable cover $a'$, the tub, bucket or vat $a$ having a jacket $a^2$ exteriorly disposed so as to form a double wall, the space between the two walls being filled with insulating packing material $a^3$ suitable for the purpose. On the outer wall of the tub, bucket or vat is affixed an air pump $b$ connected to the compressed air reservoir $d'$ formed between the inner wall of the tub, bucket or vat and the exterior of the chamber $f'$ containing the freezing mixture.

Within the chamber $f'$ containing the freezing mixture is disposed a pipe $d^2$ which is perforated to promote agitation of the freezing mixture and to give momentum to the liquid. A pressure gage is provided at $e$ in the pipe $d$ to indicate the conditions within the tub, bucket or vat, a valve (not shown) being provided for controlling the said pressure if so desired.

The freezing mold $f$ of cylindrical or other suitable form is carried by two lateral supports $g$ at the top thereof in order to support it in such a position as to allow the freezing mixture when agitated to surround the mold so as to produce the ice in the mold $f$.

In operation the mold $f$ is filled with water and placed with its supports $g$ in position in the chamber $f'$ containing the freezing mixture within the tub, bucket or vat $a$, and the freezing mixture which is of such a nature as may be necessary or usable is agitated by the action of the compressed air coming from the air pump *b* through the perforations in the pipe $d^2$ which is necessarily immersed in said mixture.

It is obvious that as an alternative the compressed air may be produced by any of the well known means and conveyed to the perforated pipe $d^2$ in manner similar to that described without departing from my invention.

I claim:—

1. In an ice making machine in combination, a tub, bucket or vat, a chamber disposed within said tub, bucket or vat adapted to contain the freezing mixture, an air reservoir formed between the said tub, bucket or vat and said chamber, a cylindrical mold or molds adapted to be disposed within said freezing mixture, an air pump connected to said air reservoir adapted to supply air thereto, and a perforated pipe or the like connected to the said air reservoir and adapted to receive air therefrom and distribute the same within the freezing mixture so that the said freezing mixture may be agitated by the said air.

2. In an ice making machine in combination, a tub, bucket or vat, a chamber disposed within said tub, bucket or vat adapted to contain the freezing mixture, an air reservoir formed between the said tub, bucket or vat and said chamber, a cylindrical mold or molds adapted to be disposed within said freezing mixture, a source of compressed air, connected to said air reservoir adapted to supply air thereto, and a perforated pipe or the like connected to the said air reservoir and adapted to receive air therefrom and distribute the same within the freezing mixture so that the said freezing mixture may be agitated by the said air.

In testimony whereof I have signed my name to this specification in the presence of two subscribing witnesses.

CHARLES DE VERE GRANT.

Witnesses:
CHARLES J. R. BULLOUGH,
WILLIAM HENRY COLES.

Copies of this patent may be obtained for five cents each, by addressing the "Commissioner of Patents, Washington, D. C."